United States Patent Office 3,482,634
Patented Dec. 9, 1969

3,482,634
PROCESS FOR SEALING POROUS EARTH
FORMATIONS BY CEMENTING
William A. Cox, Corpus Christi, Tex., assignor to Milchem Incorporated, Houston, Tex., a corporation of Delaware
No Drawing. Filed June 28, 1968, Ser. No. 740,859
Int. Cl. E21b 33/138, 33/13
U.S. Cl. 166—292                            32 Claims

ABSTRACT OF THE DISCLOSURE

A well cementing process in which an exceptionally high-strength, semi-hard gel is formed, in situ, upon mixing an aqueous slurry of cement or an aqueous alkaline solution with an aqueous slurry of a clay mineral of the acid three-layer, expanding lattice type. The high-strength gel provides resistance to limit the flow of cement into porous earth formations for sealing said porous earth formations by said cement.

BACKGROUND OF THE INVENTION

Field of the invention

This invention relates generally to the art of drilling wells and subsequent completion and work-over operations, and more particularly to a cementing method for sealing porous earth formations employed in drilling, completion and work-over operations.

Description of the prior art

In drilling, completion and work-over operations on oil and gas wells, squeeze cementing is a well-known procedure which is used for many purposes, including the plugging of perforations in casings or liners, the blocking off or isolation of producing formations, the repairing of casing seats and the plugging of holes in ruptured or corroded casings. The primary goal of a squeeze cementing operation is to obtain a positive seal at the well bore. However, earth formations of a highly porous, permeable, or fissured character are frequently encountered, and cement, due to its inherent rheological and density properties, has a tendency to flow into these formations and away from the well bore, and to cause even larger openings in the earth formations. Such earth formations with a low resistance to the flow of cement may absorb substantial amounts, or even all, of the cement introduced into the well bore, preventing a positive seal from being obtained at the well bore. Success in obtaining a positive seal, even by the displacement of additional amounts of cement into the well bore, is uncertain, and each successive cementing attempt delays and disrupts drilling, completion or work-over operations, creating uneconomic and possibly hazardous conditions.

Many solutions have been employed or proposed for solving the problem of achieving a positive seal at the well bore in squeeze cementing operations. These include the employment of quick-setting cements; the employment of cements containing granular or fibrous materials, such as cellophane flakes or expanded perlite; the insertion of compositions commonly termed "soft plugs" into the well bore and adjacent earth formations ahead of the cement in order to plug the openings in the porous earth formations, such as a composition composed of diesel oil and bentonite; and the use of cements containing various additives to lower its density, thus reducing the cement's tendency to flow into the earth formations away from the well bore.

All of the procedures and compositions heretofore employed suffer various disadvantages arising from the character of the materials employed, the procedures by which they are applied, and the conditions encountered in the well. Some are limited in their application to shallow holes. Others involving the insertion of materials into the well bore ahead of the cement slurry frequently result in plugs which prevent the displacement of the cement into the well bore. Others require as a prerequisite to success the existence of certain conditions within the well bore or adjacent earth formations, however, these conditions are usually not controllable and their presence is often not even ascertainable. Still others involving the addition of various materials to the cement result in a substantial loss of the compressive strength of the cement.

The present invention has for its primary object the provision of a composition and a method of applying the same which obviate various disadvantages, as previously noted, of prior compositions and procedures. Other objects and advantages of this invention will be apparent from the description and claims which follow.

SUMMARY OF THE INVENTION

The present invention contemplates the use of a unique clay material and conventional cement used in well cementing operations, both in aqueous slurries, which, when mixed in the well bore, react to form, in the openings of the adjacent porous earth formations, a high-strength gel of semi-hard or stiff plastic consistency which quickly provides resistance to the flow of cement into the formations thereby effectively holding the body of cement in the proximity of the well bore. Thus an adequate volume of the cement slurry is caused to remain in the well bore where it will set and harden, thereby effectuating a positive seal. The unique characteristics of the aforementioned clay material have been previously described in Browning et al., Patent No. 3,303,882.

An additional advantage resulting from the use of a slurry of this clay material is that its density and flow properties prevent the enlargement of openings and passages in the porous earth formations to the extent which would be effected by the use of a cement slurry alone, resulting consequently in less penetration of the formations than if a cement slurry along were used.

As an unexpected and non-obvious advantage, it was discovered that the clay slurry will act as a flush of the zone of the well bore to be cemented, preventing any foreign material, such as drilling mud, from contaminating the cement slurry when it is subsequently introduced into the well bore.

The ability to displace, without any difficulty, the cement slurry into the well bore subsequent to the introduction of the clay slurry into the well bore has obviated one of the disadvantages of the "soft plugs" previously used.

In one embodiment of the invention, an alkaline activator may be used in conjunction with the cement slurry to cause the formation of the high-strength gel. The use of an alkaline activator may be desirable when the resistance of the earth formations traversing the well bore is relatively low.

Regardless of whether the alkaline activator is used or the cement alone is used to form the high-strength gel, it is preferred that a spacer material be interposed between the reactive materials at the time they are being introduced into the drill string or other pipe string to prevent any reaction until the materials reach the zone of the well bore which is to be sealed from the adjacent porous earth formations. Any spacer material known to those skilled in the art can be used. Preferably, it should have a density equal to or greater than that of the clay slurry and should be immiscible with the reactive materials.

The procedure, in accordance with the preferred use of this invention, involves the introduction of the clay slurry into the well bore, followed immediately and successively by a spacer material and the cement slurry. If the use of an alkaline activator is desired, the introduction of the clay slurry and the spacer material into the well bore is followed immediately and successively by an aqueous solution of an alkaline activator, additional spacer material and the cement slurry. Where the resistance of the earth formations traversing the well bore is extremely low, it may be found desirable to reverse the order in which the clay slurry and the alkaline activator solution are introduced into the well bore. The successive displacement of these materials is readily effected by the use of conventional cementing equipment. The reaction, which is activated by the alkaline cement or the alkaline activator, occurs almost instantaneously upon admixture of the materials, in situ, to cause the formation of an exceptionally high-strength gel which provides resistance to the flow of the cement slurry into the formations allowing an adequate amount of cement to remain in the well bore to effectuate a positive seal.

DESCRIPTION OF PREFERRED EMBODIMENTS

The clay mineral employed in accordance with this invention is a natural clay which is found to have a combination of unique properties in that it is capable of forming a readily pumpable slurry, even in concentrations of 200 lbs. or more per barrel of water, and which, when admixed with cement or an alkaline activator, will quickly form an unusually high-strength, semi-hard gel having very high water-imbibing properties.

The clay mineral, in accordance with this invention, may be further generally characterized as an acid three-layer clay mineral of the expanding lattice type which possesses, and may be further characterized by, the unique combination of properties mentioned above, namely, the ability to form pumpable slurries of relatively high concentrations and to rapidly form very high-strength gels upon activation with an alkaline material. Also, acid clays of this type generally develop pH values in the range from about 3.5 to about 4.5 when slurried in fresh water.

Clay minerals having the unique properties mentioned have been found in natural deposits, and particularly in deposits located in Munroe and Itawamba counties, Miss.

Cements generally used in squeeze cementing operations on oil and gas wells can be used in accordance with this invention, and the cement slurries can be prepared by conventional methods, since aqueous slurries of all such cements are alkaline in nature and are capable of providing hydroxyl ions for reaction with the acid clay mineral.

The mechanism of the reaction occurring between this unique clay mineral and cement is not fully understood but appears to involve an initial quick flocculation of the clay slurry followed by a further rapid gelling action as the alkalinity of the clay slurry increases. The presence of hydroxyl ions significantly affects the extent of flocculation of the clay. In general, the activation occurs when the clay slurry attains the neutral or slightly alkaline state and intensifies as pH values exceed about 9.5.

The activator material is an aqueous solution of an alkaline material which is capable of providing hydroxyl ions and alkali cations for reaction with the clay mineral. The preferred examples of such alkaline materials are sodium hydroxide, sodium silicate, lithium hydroxide, ammonium hydroxide and mixtures thereof.

In addition to the flocculation and gelling actions previously described in connection with the reaction between the clay mineral and cement, it is thought, although not fully understood, that the addition of an alkaline activator solution will cause a form of a base exchange reaction to occur, whereby the inner layer cations of the clay, such as calcium or hydrogen, are replaced by the alkali cations, such as sodium, lithium or ammonium, from the particular alkaline activator solution used. The use of the alkaline materials previously mentioned, as contrasted with the use of cement and most other alkaline materials, results in a quicker setting and stronger gel because of the excellent swelling properties of sodium, lithium and ammonium clays of the acid three-layer, expanding lattice type when in an alkaline environment, expecially the sodium clays.

Presently, identification of a particular kind of clay mineral, which is effective in accordance with this invention, can only be made by generally empirical tests, namely, the exceptional gelling action when the clay mineral in an aqueous slurry is admixed with an aqueous alkaline solution, together with the ability to form readily pumpable slurries in water under high loading conditions. The results of these empirical tests are so quickly obvious that they serve to readily identify a clay mineral suitable for purposes of this invention and to differentiate from all other clays.

It appears that the clay mineral must, in any event, fall within the general characterization mentioned, namely, an acid clay mineral of the three-layer, expanding lattice type, since other clays, such as the Illites, for example, are ineffective for the purposes of this invention.

When an alkaline activator is used in conjunction with the cement to activate the clay mineral, it is found that various materials may be added to the clay slurry which appear to facilitate the base exchange by forming insoluble precipitates with the soluble calcium ions which will be released by the exchange reaction with the sodium, lithium and ammonium ions supplied from the alkaline activator materials. Such precipitants include the alkali and ammonium carbonates and phosphates and, when required, will be added in small quantities to the clay slurry. It will be evident that care must be exercised in the addition of such material, in order not to render the slurry alkaline before its admixture with the alkaline activator. With similar caution, small amounts of sodium acid pyrophosphate may be added to the slurry to act as a defluocculating agent to render the slurry more pumpable and also to counteract the inhibiting effect on the gelling action by sodium chloride in brines frequently present in the connate fluids contained in the earth formations traversed by well bores.

In some cases it may also be found desirable to incorporate in the final gel the various well known granular or fibrous materials employed in conventional lost circulation control procedures. Such materials, when employed, will be incorporated in the clay slurry before its introduction into the well.

The clay slurry may be prepared by thoroughly admixing the desired quantity of the clay mineral in finely powdered form in fresh water. Preferred admixtures will range from about 125 to about 200 pounds of the clay per barrel (42 gallons) of water. It appears on the basis of present experience that the greater the quantity of clay which can be incorporated in the slurry while still producing a pumpable slurry the stronger and otherwise more effective the gel which may be produced in situ. The particle size of the clay may be varied. Generally, it appears that the smaller the particle size, the better will be the resulting gel. In some cases, however, a mixture of different particle sizes may be found desirable, particularly for filling relatively large voids in porous earth formations.

Where required, one or more of the other additives mentioned previously may be incorporated in the clay slurry preparatory to introducing it into the well bore.

When the resistance of the porous earth formations is relatively low, it has been found desirable to use an activator material in conjunction with the cement slurry to cause the formation of the high-strength gel. The introduction of the clay slurry into formations of low resistance results in a deeper than normal penetration of the earth formations by the clay slurry, as well as greater dispersion of the clay slurry. The existence of such earth formations warrants the use of a material that will not further disturb the formations by enlarging the openings and fissures already present. The rheological and density properties of a cement slurry make its use as the reactive agent undesirable where formations of this type are found. In contrast, an aqueous solution of an alkaline activator will have much less effect on unstable formations, and its introduction into the well bore before the cement slurry's introduction will produce, in general, better results as to the strength of the gel formed and its proximity to the well bore.

The relative resistance of the earth formations encountered in the drilling of oil and gas wells is indicated by the pressure required to inject a fluid at a prescribed rate into the formations. The fluid used to determine the injection rate is usually the same fluid that is being utilized in the particular drilling, completion or work-over operation, for example, drilling muds are used during drilling operations. A determination of these pressures at prescribed injection rates can be made by those skilled in the art prior to the introduction of any clay slurry into the well bore. Although further use of this invention may suggest other desirable conditions for the use of the alkaline activator, present experience indicates as a general guide that an alkaline activator should be used when a pressure of 2000 pounds per square inch or less is required to inject two barrels per minute of fluid into the earth formations.

If an alkaline activator is to be used, the clay slurry, in general, will be introduced into the well bore first, followed successively by the alkaline activator solution and the cement slurry. However, when the relative resistance of the earth formations travering the well bore is extremely low, it may be desirable to reverse the order of the introduction of the clay slurry and the alkaline activator solution into the well bore. As a general guide the alkaline activator solution should be introduced into the well bore prior to introduction of the clay slurry when a pressure of 500 pounds per square inch or less is required to inject two barrels per minute of fluid into the earth formations, however, further use of this invention may indicate other conditions determinative of the use of this particular procedure. Because the preferred alkaline activator solution containing a mixture of sodium hydroxide and sodium silicate is more adhesive than the clay slurry, the introduction of these materials into the well bore and adjacent earth formations in this order presents the most favorable conditions for obtaining the formation of the strongest gel within the closest possible proximity of the well bore.

An aqueous solution of an alkaline activator is prepared by dissolving in water an amount of the activator material as required to form an aqueous solution of the desired concentration. For example, an admixture of 18% sodium hydroxide and 82% sodium silicate can be admixed with water to form a solution containing approximately 40% by weight of these materials. Other admixtures of these chemicals, or solutions of either one alone, may vary widely within a range from about 10% to about 15% by weight of the solution. The volume of activator solution employed would generally range from about 3% to about 10% by volume of the clay slurry, depending, in part, upon the concentration of the activator solution, the clay load in the slurry, and the conditions in the well bore and adjacent earth formations.

The use of a spacer material, although not essential to the use of this invention, is preferred for efficiency and economic reasons in obtaining a positive seal of the porous earth formations. When used, the spacer material is introduced into the drill string or other pipe string after the clay mineral slurry is added but prior to the introduction of the cement slurry to prevent any reaction between the clay material and the cement in the drill string or other pipe string. Possible plugging of the drill pipe or tubing could result if the gel starts to form before the materials reach the zone in the well bore which is to be sealed with cement. If an alkaline activator solution is used in conjunction with the cement slurry to activate the clay slurry, the spacer material should be used twice to keep these three reactive materials separated while they are in the drill pipe or tubing, regardless of the order in which these three materials are introduced into the well bore.

Any spacer material known to those skilled in the art can be used as long as it possesses certain density and mixing properties. The density of the spacer material should be equal to or greater than the density of the clay mineral slurry, which is generally from about 10.2 to 10.6 pounds per gallon. For use with an alkaline activator solution, it is preferred that the spacer material have a density approximately equal to the density of the aqueous solution of the alkaline activator. The density of the preferred aqueous activator solution containing a mixture of sodium silicate and sodium hydroxide is approximately 12.6 pounds per gallon. The second characteristic that is required of any spacer material is its immiscibility with the reacting materials it is used to separate. An example of a material with these properties is a water-in-oil emulsion with a density of approximately 12.5 to 12.6 pounds per gallon. In most instances, enough spacer material should be interposed between the reactive materials to fill about 30 feet of the well bore in the working area with the largest diameter.

The materials are introduced into the well bore and adjacent earth formations by the use of conventional squeeze cementing procedures, regardless whether the alkaline activator solution is used. In the preferred embodiment of the invention, the requisite volume of the clay mineral slurry will first be introduced into the drill string or other pipe string and followed successively by pre-determined volumes of a spacer material and cement slurry, the successive volumes being displaced by a suitable hydraulic fluid which may be drilling mud, water or the like. The respective volumes will be calculated to assure entrance of the clay mineral slurry into the porous earth formations followed immediately by the cement slurry. Due to the permeable nature of the earth formations, the clay mineral slurry will flow into the openings and interstices thereof and the following cement slurry will likewise enter into the openings and interstices where admixing will occur, quickly producing a strong, semi-hard gel which will completely fill and close off the openings preventing further penetration of the cement slurry into the earth formations. This action will be signaled at the surface by a quick increase in pump pressure, thereby showing that the porous earth formations have been sealed.

By reason of the strength of the resulting gel, the gel will be strongly held in the openings in the porous earth formations even when these openings are quite large, and will prevent further penetration of the cement slurry into the earth formations. The resistance provided by the gel will allow an adequate amount of the cement slurry to remain in the well bore, so that it can set and harden and effectuate a positive seal, thus allowing a continuation of other drilling, completion or work-over operations.

The dramatic results obtained with the composition and procedure in accordance with this invention was evidenced by its application on a well located in Kenedy County, Tex. After losing complete returns while drilling at 13,994 feet, tests indicated that there was a hole in the protective casing at about 10,600 feet. An attempt to plug the hole using conventional squeeze cementing procedures proved unsuccessful as no cement was found in the protective casing, indicating, since a check of the calculations showed no over-displacement, that the formation may have taken the cement. Thereafter 35 barrels (42 gallons per barrel) of the clay mineral slurry were introduced into the drill pipe followed successively by 1.1 barrels of a spacer material and 71 barrels of cement slurry. After displacing these materials into the zone of the well bore to be cemented and into the adjacent earth formations with the use of a squeeze tool, the well was shut in for 12 hours. It was then discovered that cement had remained in the well bore effectively plugging the hole in the casing, thereby allowing a resumption of drilling operations.

Successful results were also obtained by an application of this invention on a well located in Victoria County, Tex. An operator had unsuccessfully attempted to block squeeze perforations at 1,920 feet with 500 sacks (100 pound sacks) of cement. Thereafter the procedure in accordance with this invention was employed to introduce into the well bore 10 barrels of the clay mineral slurry, 60 gallons of spacer material, approximately 25 barrels of cement (100 sacks) and 24 gallons of the alkaline activator solution, consisting of a mixture of sodium hydroxide and sodium silicate. The alkaline activator solution was used since the pressure required to maintain an injection rate of 2 barrels per minute was 2000 pounds per square inch. The successful application of this invention prevented the abandonment of this well and permitted production from the formation at approximately 1,900 feet.

In general, the amount of the clay mineral slurry to be introduced into the well bore may be determined by using the same factors used to determine the amount of cement slurry to be added. The required strength of the hardened cement and the subsequent operations to be performed are the factors usually, but not solely, determinative of the amount of cement that will be used. A squeeze cementing operation will utilize anywhere from 50 to 500 sacks (100 pound sacks), the median being approximately 200 sacks, of cement, with approximately 4 parts of cement, by weight, being mixed with one part of water to form the slurry. As a general rule, the volume of the clay mineral slurry is from about 0.5 to about 3 times the volume of cement slurry introduced into the well bore. In extreme cases of highly porous or permeable earth formations, it may prove advantageous to repeat the described operations.

From the foregoing, it will be evident that the composition and process in accordance with this invention provide a unique squeeze cementing method, some of the advantages of which may be briefly summarized, as follows:

(1) The use of this invention increases the likelihood of success in obtaining a positive seal on the first try, regardless whether sealing perforations, plugging holes in casings, block squeezing or repairing casing seats.

(2) This invention is not limited in its application to certain depths or to the presence of certain conditions in the well and adjacent earth formations.

(3) This invention does not require the use of additives in the cement, which may lessen its compressive strength. However, conventional cement additives may be used, if desired, without departing from this invention.

(4) The formation of a high-strength gel does not prevent the displacement of the cement.

(5) The clay mineral slurry by being introduced ahead of the cement slurry acts as a flush preventing the drilling mud or other foreign material from contaminating the cement slurry.

While especially useful in squeeze cementing applications in drilling, completion and work-over operations, the composition and method in accordance with this invention may be employed in water flood type of secondary oil recovery operations, as for selectively sealing-off the more permeable portions of a producing formation to prevent channeling and excessive loss of the flooding fluids.

Another useful application of this invention is for controlling loss circulation in the drilling of wells, especially where a more permanent bridge or plug is desired for greater and more complete stability. In such an application, the alkaline activator would first be introduced into the well bore, followed successively by a spacer material, the clay mineral slurry, more spacer material and the cement slurry.

Other useful applications of this invention are in grouting and soil stabilization for foundation purposes and the like.

It will be understood that numerous modifications and alterations may be made in the illustrative embodiments of the invention herein described within the scope of the appended claims but without departing from the spirit of this invention.

I claim:

1. In sealing porous earth formations by cementing, the method of providing resistance to limit the flow of cement into said porous earth formations, comprising the successive steps of: first, introducing into said porous earth formations, an aqueous slurry of the clay mineral of the acid three-layer, expanding lattice type characterized by the properties of (a) forming a readily pumpable slurry in high concentrations (from about 125 to about 200 pounds per barrel (42 gals.) of fresh water); and (b) of forming, when in aqueous slurry, exceptionally high-strength, semi-hard gel upon admixture with an alkaline material; second, introducing into said porous earth formations an aqueous slurry of cement; and causing intermixing of said slurries, in situ, in said earth formations, the alkalinity of the cement slurry rendering the clay mineral slurry neutral to alkaline to cause said clay mineral slurry to form a high-strength gel.

2. The method according to claim 1 wherein the situs of said porous earth formations is in the wall of a well bore.

3. The method according to claim 1 wherein said clay mineral slurry before intermixing with said cement slurry has a pH value in the range from about 3.5 to about 4.5.

4. The method according to claim 1 wherein the volume of said clay mineral slurry is from about 0.5 to about 3 times the volume of said cement slurry.

5. The method according to claim 1 wherein a spacer material, characterized by the properties of (a) having a density equal to or greater than the density of the said clay mineral slurry, and (b) being immiscible with the said clay mineral slurry and the said cement slurry, is introduced into the said porous earth formations after the introduction of the said clay mineral slurry but before the introduction of the said cement slurry.

6. The method according to claim 5 wherein the situs of said porous earth formations is in the wall of a well bore.

7. The method according to claim 5 wherein said clay mineral slurry before intermixing with said cement slurry has a pH value in the range from about 3.5 to about 4.5.

8. The method according to claim 5 wherein the volume of said clay mineral slurry is from about 0.5 to about 3 times the volume of said cement slurry.

9. The method according to claim 1 wherein an aqueous solution of an alkaline material selected from the class consisting of sodium hydroxide, lithium hydroxide, sodium silicate, ammonium hydroxide, and mixtures thereof is introduced into the said porous earth formations after the introduction of the said clay mineral slurry but before the introduction of the said cement slurry; and causing intermixing of said aqueous solution and the said clay mineral slurry, in situ, in said earth formations, the relative proportions of the intermixed materials rendering said clay mineral slurry neutral to alkaline to cause said clay mineral slurry to form a high-strength gel.

10. The method according to claim 9 wherein the situs of said porous earth formations is in the wall of a well bore.

11. The method according to claim 9 wherein said clay mineral slurry before intermixing with said aqueous solution has a pH value in the range from about 3.5 to about 4.5.

12. The method according to claim 9 wherein said alkaline material is a mixture of sodium hydroxide and sodium silicate totaling about 40% by weight of said aqueous solution.

13. The method according to claim 9 wherein the volume of said aqueous solution is in the range of from about 3% to about 10% of the volume of said clay mineral slurry.

14. The method according to claim 9 wherein said clay mineral slurry has incorporated therein a base exchange-facilitating material selected from the class consisting of sodium carbonate, sodium phosphate, sodium acid pyrophosphate, and mixtures thereof in amounts less than sufficient to render said slurry neutral.

15. The method according to claim 9 wherein a spacer material, characterized by the properties of (a) having a density equal to or greater than the density of the said clay mineral slurry, and (b) being immiscible with the said clay mineral slurry, the said aqueous solution of the said alkaline material and the said cement slurry, is introduced into the said porous earth formations after the introduction of the said clay slurry but before the introduction of the said aqueous solution, and again introduced into said formations after the introduction of the said aqueous solution but before the introduction of the said cement slurry.

16. The method according to claim 15 wherein the situs of said porous earth formations is in the wall of a well bore.

17. The method according to claim 15 wherein said clay mineral slurry before intermixing with said aqueous solution has a pH value in the range from about 3.5 to about 4.5.

18. The method according to claim 15 wherein said alkaline material is a mixture of sodium hydroxide and sodium silicate totaling about 40% by weight of said aqueous solution.

19. The method according to claim 15 wherein the volume of said aqueous solution is in the range of from about 3% to about 10% of the volume of said clay mineral slurry.

20. The method according to claim 15 wherein said clay mineral slurry has incorporated therein a base exchange-facilitating material selecting from the class consisting of sodium carbonate, sodium phosphate, sodium acid pyrophosphate, and mixtures thereof in amounts less than sufficient to render said slurry neutral.

21. The method according to claim 1 wherein an aqueous solution of an alkaline material selected from the class consisting of sodium hydroxide, sodium silicate, lithium hydroxide, ammonium hydroxide and mixtures thereof is introduced into the said porous earth formations followed successively by the said clay mineral slurry and the said cement slurry; and causing intermixing of said aqueous solution and the said clay mineral slurry, in situ, in said earth formations, the relative proportions of the intermixed materials rendering said clay mineral slurry neutral to alkaline to cause said clay mineral slurry to form a high-strength gel.

22. The method according to claim 21 wherein the situs of said porous earth formations is in the wall of a well bore.

23. The method according to claim 21 wherein said clay mineral slurry before intermixing with said aqueous solution has a pH value in the range of about 3.5 to about 4.5.

24. The method according to claim 21 wherein said alkaline material is a mixture of sodium hydroxide and sodium silicate totaling about 40% by weight of said aqueous solution.

25. The method according to claim 21 wherein the volume of said aqueous solution is in the range from about 3% to about 10% of the volume of said clay mineral slurry.

26. The method according to claim 21 wherein said clay mineral slurry has incorporated therein a base exchange-facilitating material selected from the class consisting of sodium carbonate, sodium phosphate, sodium acid pyrophosphate, and mixtures thereof in amounts less than sufficient to render said slurry neutral.

27. The method according to claim 21 wherein a spacer material, characterized by the properties of (a) having a density equal to or greater than the density of the said clay mineral slurry, and (b) being immiscible with the said clay mineral slurry, the said aqueous solution of the said alkaline solution and the said cement slurry, is introduced into the said porous earth formations after the introduction of the said aqueous solution but before the introduction of the said clay mineral slurry, and again introduced into said formations after the introduction of the said clay mineral slurry but before the introduction of the said cement slurry.

28. The method according to claim 27 wherein the situs of said porous earth formations is in the wall of a well bore.

29. The method according to claim 27 wherein said clay mineral slurry before intermixing with said aqueous solution has a pH value in the range from about 3.5 to about 4.5.

30. The method according to claim 27 wherein the alkaline material is a mixture of sodium hydroxide and sodium silicate totaling about 40% by weight of said aqueous solution.

31. The method according to claim 27 wherein the volume of said aqueous solution is in the range of from about 3% to about 10% of the volume of said clay mineral slurry.

32. The method according to claim 27 wherein said clay mineral slurry has incorporated therein a base exchange-facilitating material selected from the class consisting of sodium carbonate, sodium phosphate, sodium acid pyrophosphate, and mixtures thereof in amounts less than sufficient to render said slurry neutral.

References Cited

UNITED STATES PATENTS

| | | | |
|---|---|---|---|
| 2,198,120 | 4/1940 | Lerch | 166—292 |
| 2,320,954 | 6/1943 | Sullivan | 61—36 |
| 2,863,509 | 12/1958 | Messenger et al. | 166—292 |
| 3,028,913 | 4/1962 | Armentrout | 166—292 |
| 3,111,006 | 11/1963 | Caron | 166—292 |
| 3,227,213 | 1/1966 | Smith | 166—292 |
| 3,274,784 | 9/1966 | Shock et al. | 166—292 X |
| 3,303,882 | 2/1967 | Browning et al. | 166—292 |

STEPHEN J. NOVOSAD, Primary Examiner

U.S. Cl. X.R.

61—36; 166—270, 300; 175—72

UNITED STATES PATENT OFFICE
CERTIFICATE OF CORRECTION

Patent No. 3,482,634          Dated December 9, 1969

Inventor(s) William A. Cox

It is certified that error appears in the above-identified patent and that said Letters Patent are hereby corrected as shown below:

Column 5, line 38, "travering" should be -- traversing --; line 65, "15%" should be -- 50% --.

SIGNED AND
SEALED
APR 28 1970

(SEAL)
Attest:

Edward M. Fletcher, Jr.
Attesting Officer

WILLIAM E. SCHUYLER, JR
Commissioner of Patents